(No Model.)
N. A. NEWTON.
CARRIAGE GEAR COUPLING.
No. 478,128. Patented July 5, 1892.
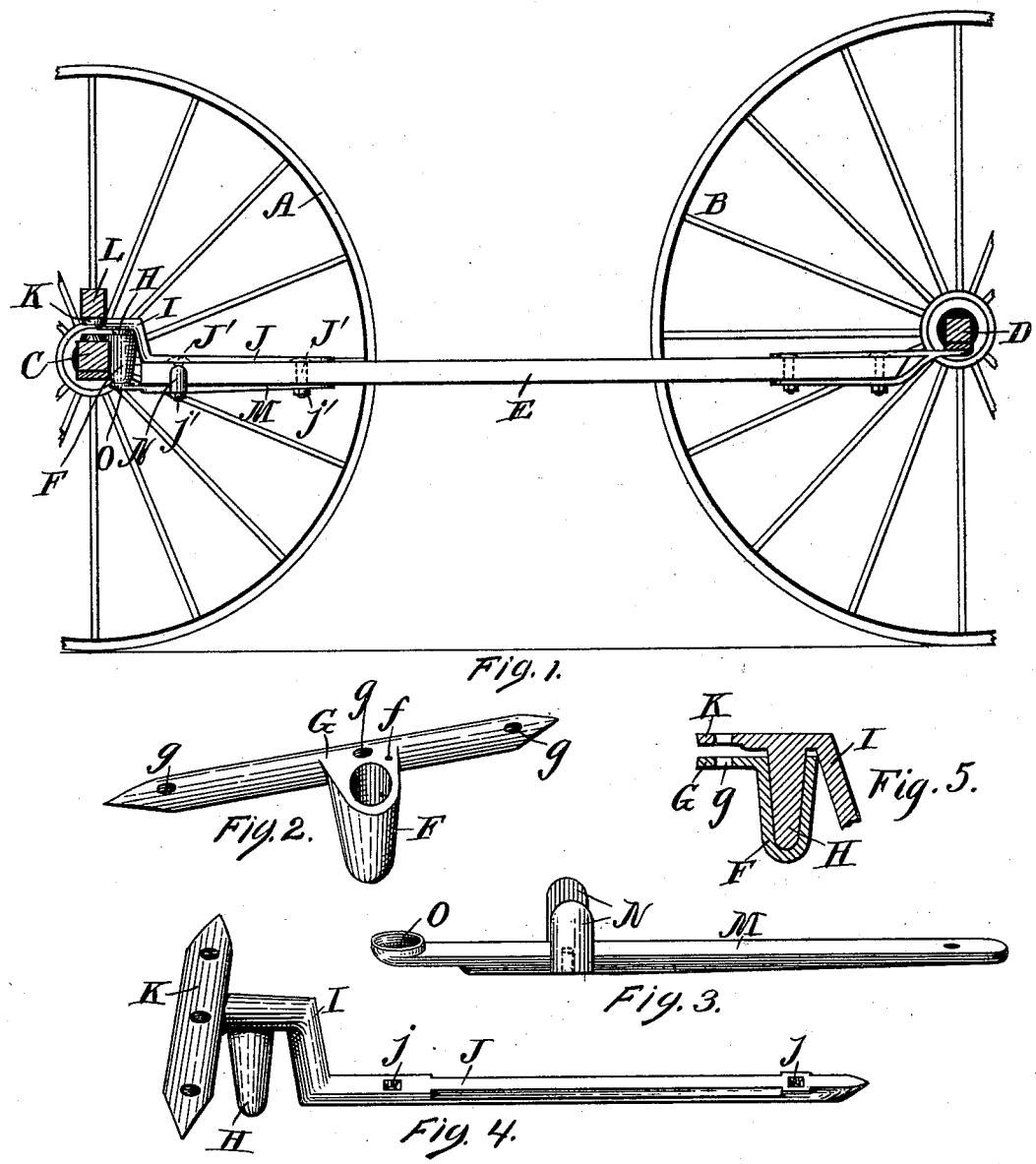
WITNESSES:
INVENTOR

UNITED STATES PATENT OFFICE.

NELSON A. NEWTON, OF KALAMAZOO, MICHIGAN.

CARRIAGE-GEAR COUPLING.

SPECIFICATION forming part of Letters Patent No. 478,128, dated July 5, 1892.

Application filed January 28, 1892. Serial No. 419,491. (No model.)

*To all whom it may concern:*

Be it known that I, NELSON A. NEWTON, a citizen of the United States, residing at Kalamazoo, in the county of Kalamazoo and State of Michigan, have invented certain new and useful Improvements in Carriage-Gear Couplings; and I do hereby declare the following to be a full, clear, and exact description of the invention, such as will enable others skilled in the art to which it appertains to make and use the same.

This invention relates to devices whereby the front running-gear and rear running-gear of vehicles are pivotally connected; and it consists, chiefly, in the substitution for the ordinary king-bolt of a conoidal piece fitting in a conoidal socket and a cup receiving the rounded and closed bottom of the said socket, these three parts thus connecting the two parts of the wagon-gear together. It also consists in certain additional features and details of construction and combination hereinafter particularly set forth and claimed.

In the accompanying drawings, Figure 1 represents a vertical longitudinal section through a wagon-gearing embodying my invention, taken in a plane a little on the nearer side of the reach. Fig. 2 represents a detail perspective view of the socket. Fig. 3 represents a similar view of the bar attached to the under side of the reach and provided on its end with a cup for receiving the lower closed end of the socket. Fig. 4 represents a similar view of the bar attached to the upper side of the reach and the conical piece formed thereon, which takes the place of the ordinary king-bolt; and Fig. 5 represents a detail vertical section of the coupling.

A designates the front wheel shown, B the rear wheel, C the front axle, D the rear axle, and E the reach of the vehicle, all constructed and arranged as usual.

F designates a conoidal socket, closed and rounded at the bottom and formed with or rigidly attached to a plate or bar G, which rests on the front axle C, being secured to the latter by screws passing through holes $g$ in the said plate or by other suitable means.

H designates a conoidal pivot-piece, which is formed with or rigidly attached to the upwardly-bent forward part I of a longitudinal bar J, which is attached to the top of the said reach by bolts J', passing through the holes $j$ of the said bar, also through the reach, and provided with nuts $j'$, or by any other convenient means. The front end of the said bar is provided with a transverse piece K, to which the transverse wooden cross-bar or bolster L may be fastened. The pivot-piece H extends downward and fits into the said socket, allowing the front axle and wheels to turn as on a king-bolt, which the said pivot-piece in effect is. The cavity of the said socket is preferably made slightly larger than the said pivot-piece to allow for an ample supply of oil, but fits it closely enough to afford a good steady bearing. When these parts are together, oil is supplied to the interior of the said socket through a hole $f$ in the top of the latter near the central aperture or mouth of the socket.

M designates a longitudinal bar fastened to the under side of the reach by the bolts J' aforesaid, which pass through holes $m$ of this bar after passing through the bar J and reach, as aforesaid, this bar M being provided with raised lugs N, which fit against the sides of the reach and serve as lateral braces. The forward end of the said bar is provided with a shallow cup O, having a concavity in its upper face which extends beyond the said reach and receives the lower end of the conoidal socket F. The said socket is therefore held between the said cup and conoidal piece, and the pivotal line of the front gear passes through the center of these three parts considerably behind the front axle. This allows the vehicle to turn shorter and on less ground than if the pivotal line were over the said axle. As no bolt passes through the latter, its strength remains unimpaired.

The coupling is secure and noiseless, involving little wear, and not costly to manufacture.

The chief utility of the cup O is to prevent the pivot-piece H from jumping out of the socket J in traveling over rough roads. It is not absolutely necessary elsewhere, although always an advantage. The socket J will receive and hold oil enough for the continuous lubrication of the main wearing-surfaces during a considerable time. Any surplus of oil will flow over the outside of the said socket into the cup O and serve as a lubricant between it and the lower end of the said socket.

Having thus described my invention, what I claim as new, and desire to secure by Letters Patent, is—

1. The reach-iron J, provided with a downwardly-facing conoidal pivot-pin H, in combination with the upwardly-facing socket F, closed at the bottom and adapted to receive the said pivot-pin, the bar G, with which the said socket is formed, and the front axle, to which the said bar is attached, substantially as set forth.

2. A vehicle-gear coupling consisting of a conoidal oil-holding socket closed at the bottom, in combination with a conoidal pivot-piece fitting therein, a cup receiving the lower end of the said socket, the front running-gear of a vehicle, and the rear running-gear thereof, the said socket being fastened to one of the said parts of the running-gear and the said pivot-piece and cup being fastened to the other of said parts of the running-gear so as to hold the socket between them, substantially as set forth.

3. A vehicle-gear coupling consisting of a front running-gear of a vehicle, in combination with a conoidal oil-holding socket attached thereto, the rear running-gear, a conoidal pivot-piece attached to the latter and fitting in the said socket, and a cup or stop also attached to the rear running-gear and preventing the said pivot-piece from jumping out of the said socket, substantially as set forth.

In testimony whereof I affix my signature in presence of two witnesses.

NELSON A. NEWTON.

Witnesses:
ADELBERT D. HARRIS,
W. A. DOYLE.